US000002045P2

(19) United States

(12) Statutory Invention Registration (10) Reg. No.: US H2045 H

Busse et al. (43) Published: Sep. 3, 2002

(54) NARROW BAND LASER SPECKLE SUPPRESSION

(75) Inventors: Lynda E. Busse, Lorton; Ishwar D. Aggarwal, Fairfax Station, both of VA (US); John A. Moon, Cumberland, RI (US)

(73) Assignee: United States of America, Washington, DC (US)

(21) Appl. No.: 08/848,623

(22) Filed: Apr. 29, 1997

(51) Int. Cl.[7] ..... G02B 6/26

(52) U.S. Cl. ..... 385/31

(58) Field of Search ..... 385/27–29, 31, 385/33, 34, 35, 37

(56) References Cited

U.S. PATENT DOCUMENTS

| | | | | | |
|---|---|---|---|---|---|
| 4,484,795 | A | * | 11/1984 | Byron | 385/28 |
| 4,768,853 | A | * | 9/1988 | Bhagavatula | 385/28 |
| 5,504,828 | A | * | 4/1996 | Cina et al. | 385/33 |
| 5,684,642 | A | * | 11/1997 | Zumoto et al. | 385/38 |
| 5,687,264 | A | * | 11/1997 | Sweatt | 385/33 |
| 5,883,748 | A | * | 3/1999 | Shum | 385/92 |
| 5,892,866 | A | * | 4/1999 | Bristow et al. | 385/28 |

* cited by examiner

*Primary Examiner*—Daniel T. Pihulic

(74) *Attorney, Agent, or Firm*—Barry A. Edelberg; Charles J. Stockstill

(57) ABSTRACT

A method and apparatus for reducing points of zero intensity, i.e. speckle pattern, emerging from a multimode fiber. The apparatus comprises a beam deflector for rotating an input beam in a conical shape around a launch lens for projecting the beam into the fiber. The rotation of the beam further incorporates the use of two tilting mirrors being 90° out of phase to ensure a conical rotation. The conical rotation of the beam deflector ensures that the lens aberrations, which are rotationally symmetric, do not play a factor in beam alignment into the fiber aperture.

16 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NARROW BAND LASER SPECKLE SUPPRESSION

FIELD OF THE INVENTION

The present invention relates generally to a method for suppressing laser speckle at an output of a short multimode optical fiber, and more particularly to a method of preserving beam pointing stability.

BACKGROUND OF THE INVENTION

In general, laser beams possess high spectral purity. As a result of the spectral purity, as a laser beam is transmitted through the core of a multimode fiber and emerges from the fiber, it exhibits points of zero intensity, also known as a "speckle pattern". The points of zero intensity are produced due to the fact that the fiber modes are coherent with one another but have random phasing. Because the laser beam emerging from the multimode fiber has points of zero intensity, it may be difficult to consistently deliver laser power onto small targets in a far field. Accordingly, the zero intensity phenomenon is a serious problem in multimode fiber-routed laser beam delivery applications.

It is further known that the speckle pattern of a laser beam emerging from a multimode fiber is sensitive to the fiber position. One known method of resolving the speckle pattern problem is to shake the fiber back and forth over long time durations on a millisecond time scale. However, in the case of a pulsed laser or in an apparatus where detector integration times are very short, the method of shaking the fiber is not desirable because no appreciable change in fiber position is possible on a sub-millisecond time scale.

Another method in use for reducing the points of zero intensity for a pulsed laser system is to incorporate a longer fiber length. Conventional multimode fibers comprise an optical core surrounded by cladding, as is well known in fiber optic technology. Light is transmitted through the core of a multimode fiber in light groups known as modes. A multimode fiber is capable of supporting light for transmission in plural groups of core modes. Higher order modes bounce back and forth as they travel the length of the fiber. Accordingly, the higher order modes are time delayed with respect to the lower order modes. If the time delay is longer than the temporal coherence length of the laser, the core modes add in intensity as they emerge from the fiber, resulting in a suppressed speckle pattern.

When incorporating the method of using a longer multimode fiber length for a pulsed system, in order to calculate the proper length of the fiber necessary a typical transform limited pulse duration, $\tau_p$, of 7 nsec is launched into the fiber. A mode delay, $\tau_{md}$ is calculated between the highest and lowest modes in a step index core clad optical fiber length L with N.A. (numerical aperture) of 0.3 and an index n of 2.4 of:

$$\frac{\tau_{md}}{L} = \frac{(N.A.)^2}{2cn} = 60 \text{ psec/m} \qquad \text{(Equation 1)}$$

The index n of 2.4 is a typical value of an infra-red (IR) transmitting $As_2S_3$ fiber, and c is the speed of light in a vacuum environment. Accordingly, a fiber length of 1.0 meter would have the highest mode delayed by 60 psec relative to the lowest mode, $LP_{01}$.

The speckle pattern which emerges from a laser beam entering a multimode fiber generally exhibits a 100% root mean square (RMS) fluctuation in amplitude. This arises because the fiber modes are all coherent with one another but have random relative phasing. In order to calculate the RMS amplitude noise between the various delayed modal components of the beam, one notes that for $\tau_{md} > \tau_p$ $$\left(\frac{\Delta I}{I}\right)\text{RMS} = \frac{\tau_p}{2\tau_{md}} \qquad \text{(Equation 2)}$$

where I is the intensity in space across the emitting aperture and the brackets are taken to mean a spatial average over this aperture. The factor of two arises from the two polarization states. For example, to produce a 25% RMS fluctuation in the beam, one needs a maximum mode delay $\tau_{md}$ of about 7 nsec, and accordingly a fiber length of at least 233 m. A mode delay $\tau_{md}$ of 7 nsec is the maximum mode delay and should therefore be viewed as a best-case estimate.

Although this length is attainable in silica fibers with reasonable optical losses for visible and near-IR lasers, this is an unrealistically long length for current mid-IR transmitting fibers such as those based on $As_2S_3$. Furthermore, in pulsed laser systems, the pulse emerging from such a long fiber is considerably longer, by nearly a factor of two, than the input pulse, which may be a disadvantage in a laser ranging or plasma generation system.

An alternative known method for reducing the points of zero intensity emerging from a multimode fiber is to increase the laser bandwidth incorporating either active or passive means. Instead of using a longer fiber length, the temporal coherence length $\tau_c$ is reduced. In this method, the amount of speckle reduction is calculated by replacing $\tau_p$ with $\tau_c$ in Equation 2. The amount of spectral bandwidth $\tau_c^-$ needed in a one meter length of the above fiber to achieve a 25% RMS speckle amplitude is 33 GHz., wherein $\tau_c$~0.25*2*60=30 psec. This spectral broadening could be produced by means of an electro-optic device for visible and near IR applications. However, most commercially available electro-optic modulators are inefficient above 1 GHz.. Accordingly, in the mid IR region, such a large broadening is not possible with current commercially available devices.

SUMMARY OF THE INVENTION

It is therefore an object of the present invention to reduce the speckle pattern of a laser beam emerging from a multimode fiber without significantly increasing the pulse width or spectral bandwidth.

It is a further object of the invention to provide a method and apparatus for suppressing laser speckle at an output of a short multimode fiber by changing the launch angle by at least one divergence in time.

In accordance with the invention, these and other objectives are achieved by providing a means for translating a laser beam in a conical shape around a launch lens for projecting into a multimode fiber thereby reducing points of zero intensity emerging from the fiber.

BRIEF DESCRIPTION OF THE DRAWINGS

These and other objects, features and advantages of the invention, as well as the invention itself, will become better understood by reference to the following detailed description when considered in connection with the accompanying drawings, wherein.

DETAILED DESCRIPTION OF THE PREFERRED EMBODIMENTS

In a laser beam apparatus incorporating a multimode fiber, modes generally mix due to twisting of the fiber. This results in points of zero intensity and hot spots, also known as a "speckle pattern," emerging from the fiber. Accordingly, it has become known in the field that multimode fibers reduce the uniformity of the beam emerging therefrom. The novel apparatus and method provide a means for reducing the speckle pattern emerging from the multimode fiber without introducing spectral or temporal broadening, appreciable loss or destroying beam pointing stability.

In order to successfully project an input beam through a multimode fiber 12 and reduce the speckle pattern 30 emerging therefrom without increasing the pulse width or spectral bandwidth, it is important to determine how far the launch angle $\theta_i$, 15 (FIG. 1*a*) must be changed in order to get complete decorrelation of the speckle patterns at the output from the fiber 12. Through experimentation it has been determined that the input beam must be moved in angle by at least one divergence angle of the launch in order to completely change the output speckle pattern emerging from the fiber. In addition, this novel method of reducing speckle pattern requires a device for steering the laser beam by one "resolvable spot" in a short amount of time. The steering device may be a beam deflector or any other device that would effectively deflect the launched laser beam.

Figure 1:
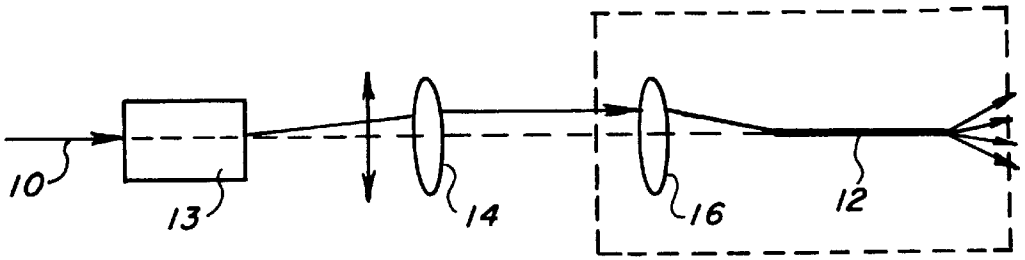
FIG. 1 is a schematic illustration of launch as a function of angle.
Figure 1A:
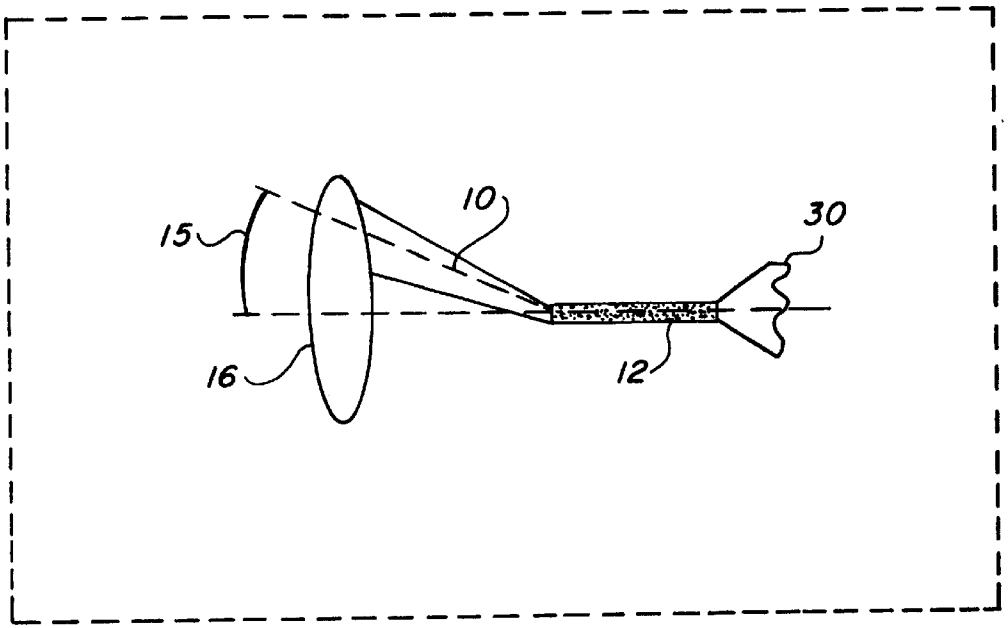
FIG. 1*a* is a more detailed illustration of the launch lens together with the multimode fiber.

Referring to the drawings, FIG. 1 is a schematic representation of a launching of a laser beam 10 into a multimode fiber 12 so as to reduce noise problems of the output beam emerging from the fiber. As the laser beam 10 is input into the fiber 12, it is desirable to dynamically change the angle of launch $\theta_i$, 15, of the beam prior to entering the fiber 12. In a preferred embodiment, the input angle of launch $\theta_i$, 15, is rotated in a conical fashion around the input lens 14 by means of a beam deflector 13. As a result of rotating the input angle of the laser beam 10, points of zero intensity emerging from the fiber are reduced without a need for increasing the pulse width or spectral bandwidth. The apparatus as shown in FIG. 1 incorporates two lenses, an input lens 14 and a launch lens 16 for projecting the input beam into the fiber. The laser beam 10 is swept across the input lens 14 within a single pulse width, thereby covering a variety of launch angles within a single pulse.

For rotation of the input beam, the novel apparatus and method incorporates two tilting mirrors for rotation of the input beam entering the fiber 12. One mirror rotates about a vertical axis and a second mirror rotates about a horizontal axis, with the phase between the two mirrors being adjusted to 90° out of phase. Accordingly, when one of the mirrors is in a rest position, the other mirror is moving. This movement of the mirror provides a circular movement for the beam deflector 13, which through experimentation has proven to be the most effective for reducing the speckle pattern emerging from the fiber 12. If the mirrors are not 90° out of phase, the movement of the input beam represents that of an ellipse as opposed to a circle, which has proven not to be as effective since the circumference of a circle has a greater diameter than that of an ellipse. Furthermore, circular movement has an added advantage in that it provides fewer lens aberrations because the input beam is rotationally symmetric. Accordingly, a significant advantage in using a beam deflector for rotation the laser beam about the input lens 14 is the ability to sweep across the input lens 14 within a single pulse width, thereby covering a variety of launch angles $\theta_i$ within a single pulse.

This novel method and apparatus require the ability to know how far the launch angle $\theta_i$ must be changed in order to get a complete decorreltaion of the speckle patterns at the output and second a means for steering a beam by one "resolvable spot" in a short amount of time. With respect to the launch angle $\theta_i$, 15, it has been determined through experimentation, that the laser beam 10 at input must be moved in angle by at least one divergence angle of the launch in order to completely change the output speckle pattern. In relation to steering the input laser beam 10, for a pulsed system, this typical requires a device which has the ability to move the laser beam within a pulse width where the pulse width is in the order of nanoseconds.

In a preferred embodiment, the input angle $\theta_i$ is rotated conically around the input lens 14 by means of a beam deflector 13. Any apparatus that will deflect laser beams as they are launched into the input lens are effective for use with the disclosed method as long as there are two lenses. In a preferred embodiment, an electro-optic beam deflector wherein light is deflected by an electric field is used. The electro-optic beam deflector rotates the laser beam at a speed in the range from about 0 to 10 GHz. In an alternative embodiment, other beam deflectors such as an acousto-optic or mechanical beam deflector may be used in place of an electro-optic beam deflectors. With an acousto-optic beam deflector, light is deflected with sound waves at a rate ranging from about 0 to about 10 MHz, and for a mechanical beam deflector light is deflected by a mechanical means at a rate ranging from about 0 to about 10 kHz. An advantage of higher speed beam deflectors is that they can smooth the beam within a single pulse. Accordingly, since many lasers are pulsed it is advantageous to move the beam within the pulse width.

Figure 2:
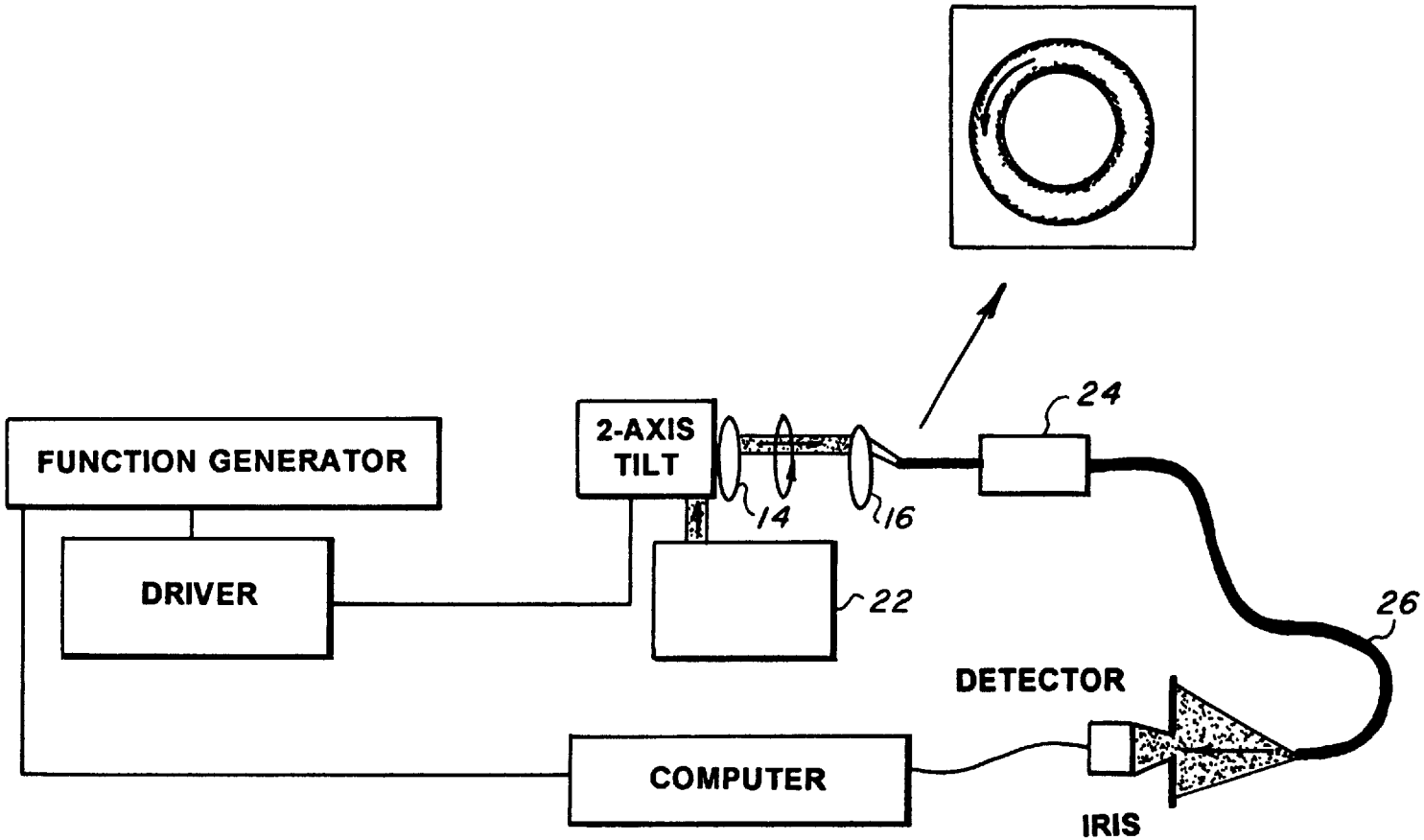
FIG. 2 is a schematic representation of an experimental configuration

FIG. 2 is an illustration of an experiment, using a HeNe 5 mW laser 22 with a wavelength $\lambda$ of 632 nm and a multimode silicia 26 having a 62/125 mm core/clad step index fiber (N.A. –0.28) with a length of 1.5 meter. A 2 cm. long mode scrambler 24 is illustrated consisting of two pieces of ribbon cable compressed between metal plates to couple the fiber modes. The correlation of the launch angle $C(\Delta\theta_i)$ is measured with the change in the launch angle $\Delta\theta_i$ between two images. The first image is defined as $I(\rho;\theta_i)$ and the second image is defined as $I(\rho;q_i+\Delta\theta_i)$, where $\rho$ is the two dimensional position vector, by $$C(\Delta\theta_i)=\int d^2\rho I(\rho;\theta_i) I(\rho;\theta_i+\Delta\theta_i)$$

By comparing the data for two different fiber lengths, it was determined that a change in angle of approximately 1.5° is necessary to completely decorrelate the intensity patterns. It was further observed during testing that a slight narrowing of the correlation function for longer-length fibers occurred, which is attributed to higher order loss of coherence due to higher-order scattering in the fiber.

Figure 3A:
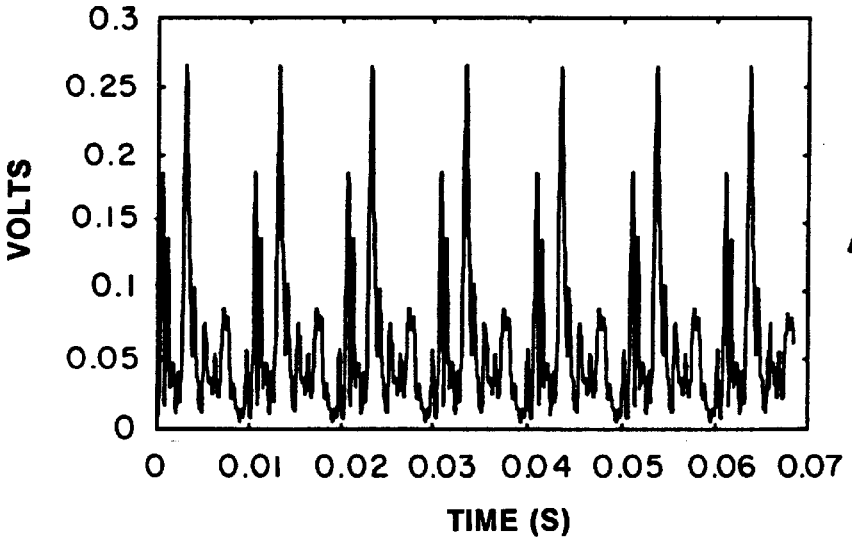
FIG. 3*a* is a representation of a temporal signal of single speckle spot at fiber output using 90 Hz rotation frequency at the input lens with a first fiber bending.
Figure 3B:
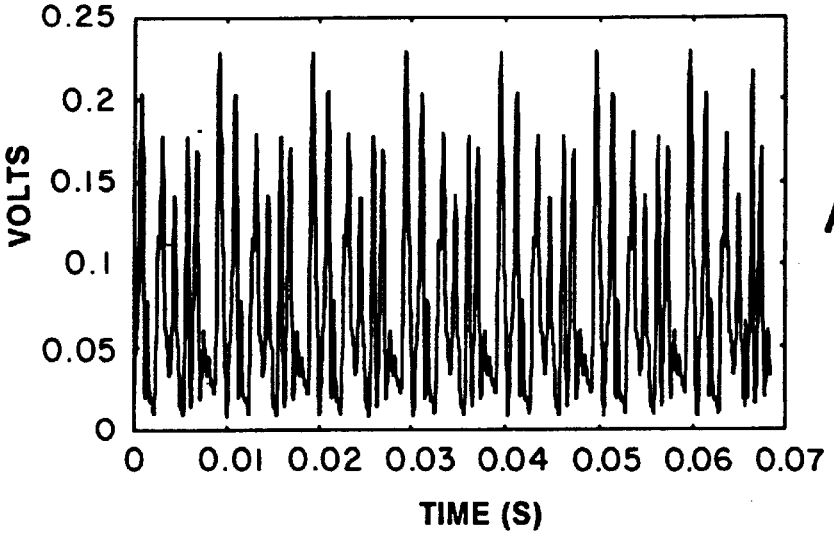
FIG. 3*b* is a representation of a temporal signal of single speckle spot at fiber output using 90 Hz rotation frequency at the input lens with a second fiber bending.
Figure 3C:
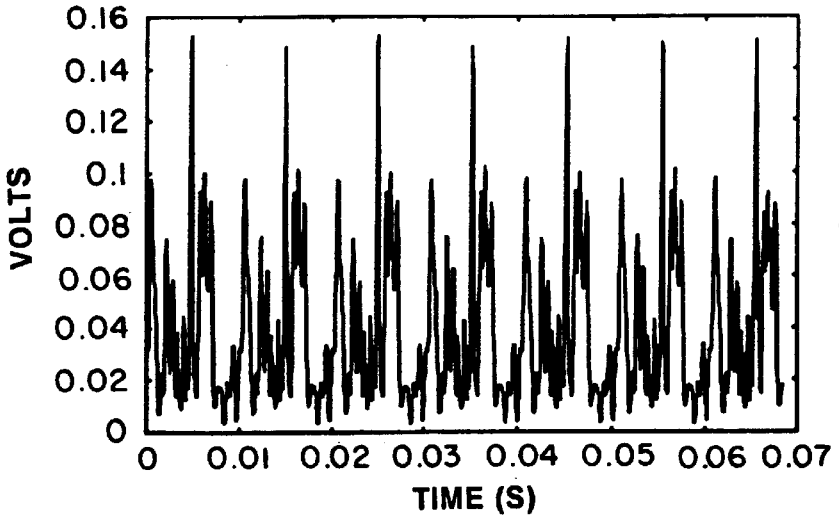
FIG. 3*c* is a representation of a temporal signal of single speckle spot at fiber output using 90 Hz rotation frequency at the input lens with a third fiber bending.
Figure 4A:
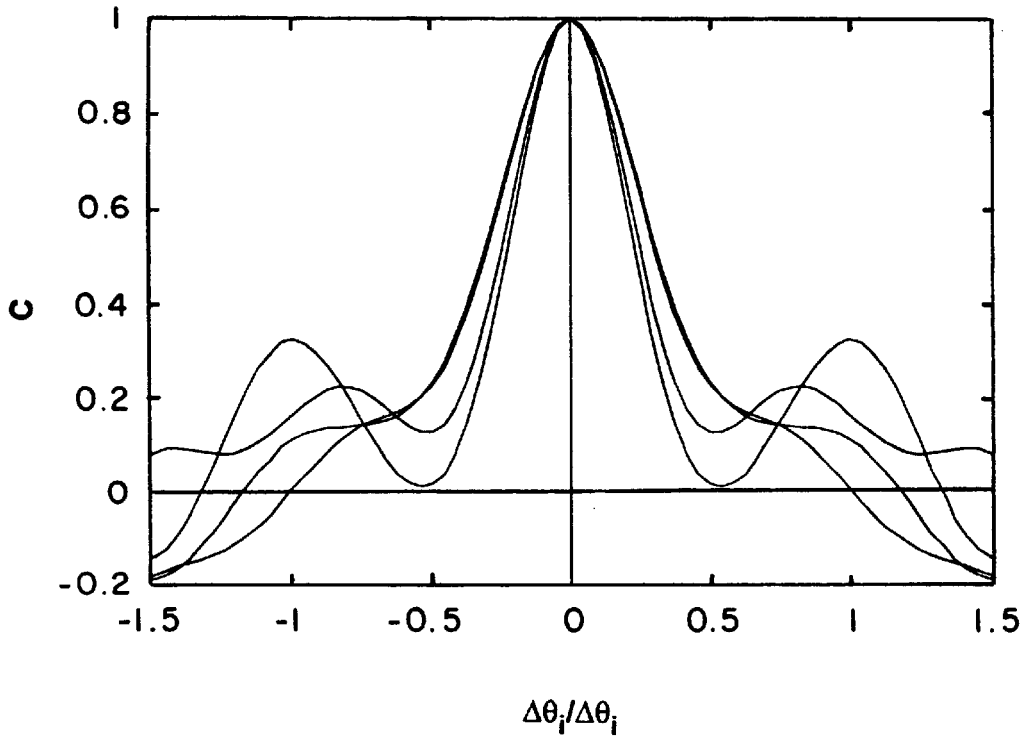
FIG. 4*a* is a graphic representation of typical autocorrelation function of a single speckle spot as a function of the launch angle
Figure 4B:
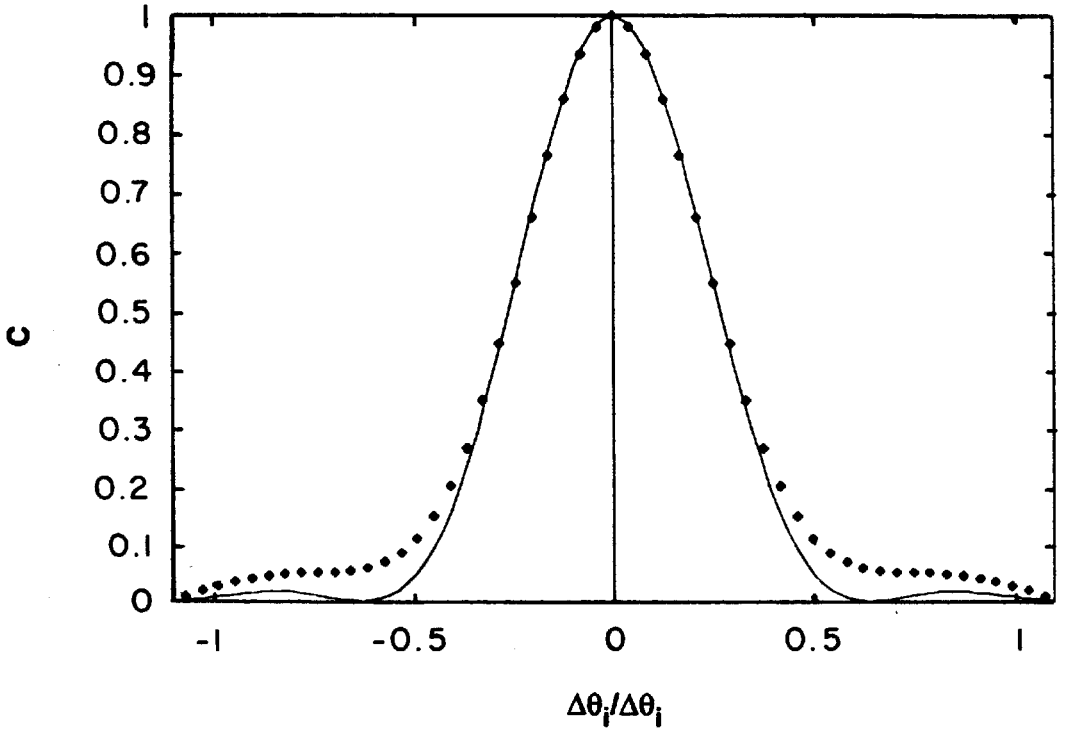
FIG. 4*b* is a graphic representation of an ensemble average of 10 measurements of a single speckle spot as a function of launch angle with a theoretical curve fit.

A typical temporal signal of a single speckle spot at fiber output using a 90 Hz rotation frequency at input lens is illustrated in FIGS. 3*a*, 3*b* and 3*c*. Each of these figures correspond to the experimental setup of FIG. 2 with a different bending of the fiber. Furthermore, FIG. 4*a* is a graphic illustration of a typical autocorrelation function of a single speckle spot as a function of the launch angle $\theta_i$, 15, normalized to the beam divergence angle, and FIG. 4*b* is an ensemble average of 10 measurements with a theoretical curve fit. Accordingly, all of the graphic representations are indications of the reduction in modal noise emerging from the multimode fiber 12 by incorporating the novel apparatus and method described above.

The novel means described above preserves the pointing stability of the beam emerging from the multimode fiber 12. Although the input beam 10 is changing direction with time as it is being launched into the input lens 14, the output beam emerging from the multimode fiber 12 remains fixed. The only effect of changing the input angle of the laser beam is the speckle pattern 30 emerging from the fiber 12, which through the means of rotating the input angle reduces the points of zero intensity emerging from the fiber, thereby providing a clean beam. The disclosed method and apparatus may be used primarily with IR fibers, but can be used with other multi-mode solid core fibers such as silica.

The above description is of a novel apparatus and method for reducing the speckle pattern of a laser beam emerging from a multimode fiber by means of manipulating the launch angle of the laser beam at input without increasing the pulse width or spectral bandwidth. Although the present invention has been described in connection with preferred embodiments thereof, it will be appreciated by those skilled in the art that additions, deletions, modifications, and substitutions not specifically described may be made without departing from the spirit and scope of the invention as defined in the appended claims and the scope should not be limited to the dimensions indicated hereinabove.

We claim:

1. A method for suppressing laser pulse at an output of a short multimode optical fiber, comprising the steps of:

projecting a laser beam into a multimode fiber by means of a plurality of lenses; and changing a launch angle of the laser beam.

2. The method of claim 1, wherein said launch angle change being at least one divergence in time.

3. The method of claim 2, wherein said launch angle change being by means of a standard beam deflector device.

4. The method of claim 2, wherein said launch angle changing method further includes:

incorporating two tilting mirrors for rotation of the beam entering the fiber.

5. The method of claim 4, wherein said mirrors being 90° out of phase.

6. The method of claim 3, wherein said beam deflector rotates said beam in a conical motion.

7. An apparatus for reducing points of zero intensity emerging from a multimode fiber, comprising:

an input laser beam;

an input lens;

a launch lens;

a multimode fiber; and a means for deflecting the input beam.

8. The apparatus of claim 7, wherein said deflecting means being an electro-optic beam deflector.

9. The apparatus of claim 8, wherein said electro-optic beam deflector rotating said laser beam from about 0 to about 10 GHz.

10. The apparatus of claim 7, wherein said deflecting means being an acousto-optic beam deflector.

11. The apparatus of claim 10, wherein said acousto-optic beam deflector rotating said beam from about 0 to about 10 MHz.

12. The apparatus of claim 7, wherein said deflecting means being a mechanical beam deflector.

13. The apparatus of claim 12, wherein said mechanical beam deflector rotating said beam from about 0 to about 10 kHz.

14. The apparatus of claim 7, further comprising two tilting mirrors for effecting rotation of beam entering said fiber.

15. The apparatus of claim 14, wherein said mirrors being 90° out of phase.

16. The apparatus of claim 15, wherein said means for deflecting the input beam effectively rotating said beam in a conical motion.

* * * * *